United States Patent
Liu et al.

(10) Patent No.: US 10,534,429 B2
(45) Date of Patent: Jan. 14, 2020

(54) METHOD OF INSTANT SHARING INVOKED FROM WEARABLE DEVICES

(71) Applicant: International Business Machines Corporation, Armonk, NY (US)

(72) Inventors: Su Liu, Austin, TX (US); Jun Su, Beijing (CN); John D. Wilson, League City, TX (US); Yin Xia, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 395 days.

(21) Appl. No.: 15/403,022

(22) Filed: Jan. 10, 2017

(65) Prior Publication Data
US 2018/0196510 A1    Jul. 12, 2018

(51) Int. Cl.
*G06F 3/01* (2006.01)
*H04L 29/08* (2006.01)
(Continued)

(52) U.S. Cl.
CPC .......... *G06F 3/013* (2013.01); *G06F 3/04842* (2013.01); *G06F 3/167* (2013.01);
(Continued)

(58) Field of Classification Search
CPC ........ G06F 3/013; G06F 3/0842; G06F 3/167; G06F 3/017; G06F 3/011; G06F 1/1698; G06F 1/163; G06F 2203/0381; H04W 76/30; H04W 76/10; H04W 12/06; H04W 12/08; H04W 12/00508; H04L 67/06; H04L 63/10; H04L 63/0861; H04L 67/306; H04B 2001/3866; H04B 1/385
See application file for complete search history.

(56) References Cited

U.S. PATENT DOCUMENTS 9,105,210 B2    8/2015    Lamb et al.
9,280,652 B1    3/2016    Bozarth
(Continued)

FOREIGN PATENT DOCUMENTS

GB    2532243 A    5/2016
WO    2015112433 A1    7/2015

OTHER PUBLICATIONS

"System and Method for I/O Switching Based on User Gaze" Disclosed Anonymously IPCOM000237313D Jun. 12, 2014.
(Continued)

*Primary Examiner* — Michael R Vaughan
(74) *Attorney, Agent, or Firm* — Patterson + Sheridan, LLP

(57) ABSTRACT

Techniques are disclosed herein for establishing a file transfer connection via wearable devices (e.g., head-mounted wearable devices). A first wearable device generates a gesture-based connection request to connect with a second wearable device. The first wearable device is associated with a first mobile device, and the second wearable device is associated with a second mobile device. The first wearable device sends the gesture-based connection request to a service to authenticate a connection with the second wearable device. The connection is established with the second wearable device in response to receiving an authentication response from the service. The first wearable device directs the first mobile device to transfer a file to the second mobile device.

17 Claims, 8 Drawing Sheets

(51) Int. Cl.
- *G06F 3/16* (2006.01)
- *G06F 3/0484* (2013.01)
- *H04W 12/06* (2009.01)
- *H04W 76/10* (2018.01)
- *H04W 76/30* (2018.01)
- *H04B 1/3827* (2015.01)
- *H04L 29/06* (2006.01)
- *H04W 12/08* (2009.01)

(52) U.S. Cl.
CPC ............ *H04L 67/06* (2013.01); *H04W 12/06* (2013.01); *H04W 76/10* (2018.02); *H04W 76/30* (2018.02); *H04B 1/385* (2013.01); *H04B 2001/3866* (2013.01); *H04L 63/0861* (2013.01); *H04L 63/10* (2013.01); *H04W 12/08* (2013.01)

(56) References Cited

U.S. PATENT DOCUMENTS

| | | | |
|---|---|---|---|
| 9,876,770 B1* | 1/2018 | Ekambaram | H04L 63/0428 |
| 2004/0061831 A1 | 4/2004 | Aughey et al. | |
| 2008/0002262 A1 | 1/2008 | Chirieleison | |
| 2008/0024392 A1 | 1/2008 | Gustafsson et al. | |
| 2009/0083847 A1 | 3/2009 | Fadell et al. | |
| 2009/0241171 A1* | 9/2009 | Sunwoo | G06F 1/163 |
| | | | 726/3 |
| 2010/0079356 A1 | 4/2010 | Hoellwarth | |
| 2010/0156812 A1* | 6/2010 | Stallings | G06F 3/04883 |
| | | | 345/173 |
| 2012/0243729 A1 | 9/2012 | Pasquero | |
| 2013/0174213 A1 | 7/2013 | Liu et al. | |
| 2013/0304479 A1* | 11/2013 | Teller | G06F 3/013 |
| | | | 704/275 |
| 2013/0307771 A1 | 11/2013 | Parker et al. | |
| 2013/0342571 A1 | 12/2013 | Kinnebrew et al. | |
| 2014/0368532 A1 | 12/2014 | Keane et al. | |
| 2014/0368534 A1 | 12/2014 | Salter et al. | |
| 2015/0302252 A1 | 10/2015 | Herrera | |
| 2016/0034029 A1 | 2/2016 | Lyons et al. | |
| 2016/0301791 A1* | 10/2016 | Kim | H04M 1/7253 |
| 2017/0118218 A1* | 4/2017 | Koottayi | H04L 63/101 |
| 2017/0316186 A1* | 11/2017 | Breitenfeld | G06F 21/10 |
| 2018/0039076 A1* | 2/2018 | Lection | G02B 27/0093 |
| 2018/0197536 A1* | 7/2018 | Liu | H04W 76/10 |
| 2018/0198783 A1* | 7/2018 | Liu | H04W 76/10 |
| 2018/0210235 A1* | 7/2018 | Boss | G02C 11/10 |

OTHER PUBLICATIONS

Method for Eye Based and Gesture Interactions with Context Aware 3D TV Video Objects Disclosed Anonymously PCOM000238796D Sep. 18, 2014.

US Application entitled, "Method of Instant Sharing Invoked From Wearable Devices," U.S. Appl. No. 15/406,503, filed Jan. 10, 2017.

International Business Machines Corporation, "List of Patents and Patent Applications Treated as Related," filed on Feb. 20, 2017.

* cited by examiner

METHOD OF INSTANT SHARING INVOKED FROM WEARABLE DEVICES

BACKGROUND

Embodiments presented herein generally relate to file transfer, and more specifically, to gesture-based techniques for controlling file transfer of a mobile device paired with a wearable device.

Mobile devices allow users to transfer files from one user to others. For example, a user may share photos stored on a smartphone with other users using various means, such as through messaging applications, emails, ad hoc networks, and the like. For instance, a user may initiate a connection on the smartphone to a mobile device of another user via a wireless connection (e.g., Wi-Fi, Bluetooth, etc.). Once connected, the user may select files and the target mobile device. Generally, the recipient (i.e., the user of the target mobile device) needs to accept and store the file on the mobile device. As another example, the mobile device may store files at a cloud storage location and create a sharing link with appropriate access permissions and send the link to a given destination, such as to an e-mail address or a username on a messaging service.

One concern with the aforementioned techniques is user inconvenience due to steps for handling device connection and authentication, generating share links, file and object selection, and so on. Further, such methods can be prone to human error. For example, a user may enter a target recipient incorrectly (e.g., due to some typographical error on the part of the user), which is a potential security risk.

SUMMARY

One embodiment presented herein describes a method. The method generally includes generating, from a first wearable device, a gesture-based connection request to connect with a second wearable device. The first wearable device is associated with a first mobile device, and the second wearable device is associated with a second mobile device. The gesture-based connection request is sent to a service to authenticate a connection with the second wearable device. The connection is established with the second wearable device in response to receiving an authentication response from the service. The first mobile device is directed, via the first wearable device, to transfer a file to the second mobile device.

Another embodiment presented herein discloses a computer program product having a computer-readable storage medium storing instructions, which, when executed on a processor, performs an operation. The operation itself generally includes generating, from a first wearable device, a gesture-based connection request to connect with a second wearable device. The first wearable device is associated with a first mobile device, and the second wearable device is associated with a second mobile device. The gesture-based connection request is sent to a service to authenticate a connection with the second wearable device. The connection is established with the second wearable device in response to receiving an authentication response from the service. The first mobile device is directed, via the first wearable device, to transfer a file to the second mobile device.

Yet another embodiment presented herein discloses a system having a processor and a memory storing program code, which, when executed on the processor, performs an operation. The operation itself generally includes generating, from a first wearable device, a gesture-based connection request to connect with a second wearable device. The first wearable device is associated with a first mobile device, and the second wearable device is associated with a second mobile device. The gesture-based connection request is sent to a service to authenticate a connection with the second wearable device. The connection is established with the second wearable device in response to receiving an authentication response from the service. The first mobile device is directed, via the first wearable device, to transfer a file to the second mobile device.

DETAILED DESCRIPTION

Figure 1:
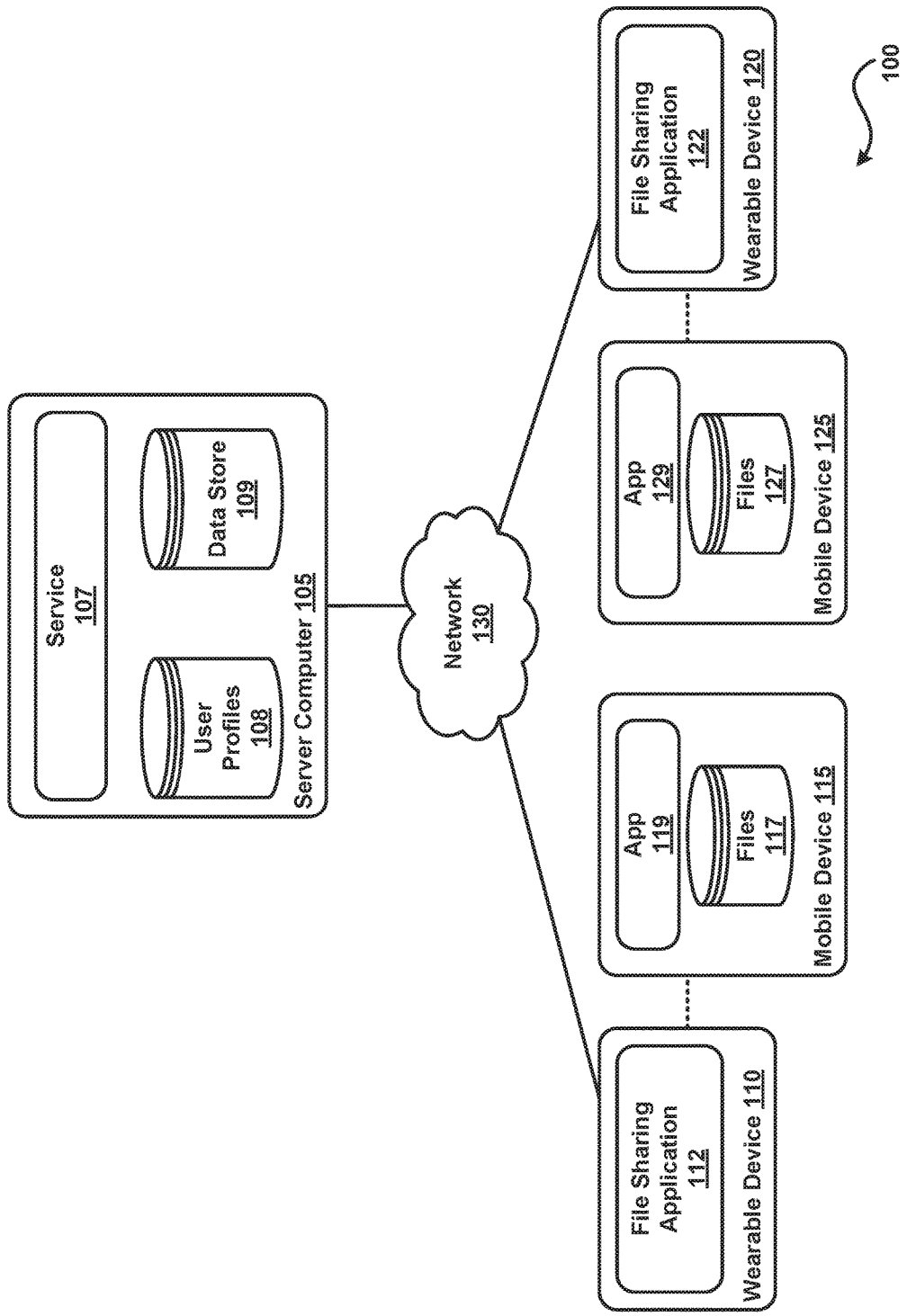
FIG. 1 illustrates an example computing environment, according to one embodiment.

Embodiments presented herein disclose a file transfer technique between mobile devices. In particular, embodiments disclose a gesture-based approach for initiating a file transfer session by a wearable device associated with a mobile device. In one embodiment, a user pairs a head-mounted wearable device with a mobile device. Generally, the head-mounted wearable-device provides a hands-free interface that allows the user to access the interface using voice recognition. The head-mounted device itself may include a number of sensors, such as a camera and microphone. In addition, when paired with the mobile device, the head-mounted device can control the mobile device, e.g., by issuing voice commands to the mobile device via the head-mounted device.

In one embodiment, the head-mounted device may initiate a file transfer connection with another head-mounted device based on gestures and voice commands. For example, the user wearing the head-mounted device may direct a gaze to another user wearing a head-mounted device. The sensors on each head-mounted device may detect that a gaze gesture is occurring. Once detected, the head-mounted device may monitor voice input for confirmation to initiate a file transfer. After receiving the voice confirmation, the head-mounted device sends a file transfer connection request to a centralized server. In turn, the centralized server authenticates the request, which includes information associated with a profile of the users participating in the transfer, device information, biometric data registered with the device, and the like. The centralized server may then authorize the connection between the head-mounted devices after authentication is complete.

While the file transfer connection is ongoing, the user may select files on the mobile device (e.g., using the camera of the head-mounted device to focus on a file listing on the mobile device, using a voice command to identify a file, etc.) for transferring to the mobile device of the other user. The user may then issue a voice command indicating the selection, which is translated to a request and sent to the centralized server. The server may validate the request, and if validated, the server allows the files to be transferred to the other device.

Embodiments provide a secure approach for transferring a file between mobile devices using gesture-based commands on a wearable device, such as by a gaze gesture on head-mounted device towards another head-mounted device. Advantageously, this approach provides a file transfer connection to be initiated proactively. For instance, two users wearing a head-mounted device and conversing with one another can trigger the file transfer connection to be established by gazing at one another with the head-mounted devices, which enables the head-mounted devices to begin listening in on the conversation between the users. The head-mounted devices receive voice input and determine whether the input corresponds to one of the users expressing a desire to transfer a file (e.g., based on natural language analysis of the voice input). Further, additional security measures (e.g., using confirmation prompts) may be applied to the file transfer to ensure that a file is authorized to be sent to the intended recipient.

FIG. 1 illustrates an example computing environment 100, according to one embodiment. As shown, computing environment 100 includes a server computer 105, a wearable device 110, a mobile device 115, a wearable device 120, and a mobile device 125, each interconnected via a network 130 (e.g., the Internet).

In one embodiment, the wearable devices 110 and 120 represent head-mounted devices. Each head-mounted device provides a hands-free interface for a given user wearing the device. For instance, the head-mounted device may present information and output data to the user via an optical display on the device. The head-mounted device also provides voice recognition features for voice commands to the device (e.g., to capture images using a camera on the device, pair with other wireless devices, etc.). Examples of such devices include wearable eyeglasses, virtual reality headsets, and the like.

Illustratively, the wearable devices 110 and 120 are paired with mobile devices 115 and 125 (e.g., smartphones, tablet computers, etc.), respectively. For instance, the wearable device 110 may be paired to the mobile device 115 using via a wireless connection, such as Bluetooth. Another way of pairing the devices to one another is through tethering the wearable device 110 to a Wi-Fi connection provided by the mobile device 115. At any rate, a given wearable device may be paired to a mobile device in various manners. Doing so allows, e.g., the wearable device 110 to control the mobile device 115 and vice versa. For example, the mobile device 115 may include an app that provides application programming interfaces (APIs) for configuring the wearable device 110. Likewise, the wearable device 110 may include APIs for accessing the mobile device 115 and apps provided therein. For instance, the wearable device 110 may use the APIs to control an app 119 on the mobile device 115 that accesses files 117 (e.g., images, videos, audio, documents, etc.) stored on the mobile device 115 or on a cloud account associated with the mobile device 115.

Further still, the wearable devices 110 and 115 each include a file sharing application 112 and 122, respectively. In one embodiment, the file sharing application 112 (122) accesses files 117 (127) maintained on the mobile device 115 (125), e.g., via APIs on the wearable device 110 (120) for controlling the app 119 (129) mobile device 115 (125). As further described below, the wearable device 110 may, via the file sharing application 112, control the app 119 to access a given file and direct the file to be sent to the mobile device 125 for storage on the device 125.

In one embodiment, the server computer 105 includes a service 107, one or more user profiles 108, and a data store 109. The server computer 105 may be a physical computing system or a virtual computing instance in the cloud. Further, the server computer 105 may provide a cloud storage platform for the wearable devices 110 and 120. In particular, users of the cloud storage platform may register a user profile 108 with the service 107. A given user profile 108 may include identifying information of the user, security credentials, social media profile information, and so on. A user registered with the service 107 may store files at a location in the data store 109 that is associated with an account of the user on the service 107.

Further, in one embodiment, the service 107 provides an authentication service allowing a given file sharing application on a wearable device to initialize a file transfer session with another wearable device or group of wearable devices. As further described below, the service 107 may receive a request from a given wearable device to initiate a file transfer with another wearable device or group of devices. The service 107 authenticates the request using information provided by the wearable device (e.g., user/password credentials, biometric data, and the like) with information stored in a corresponding user profile 108. The service 107 may send authorization to the wearable devices to establish a connection with one another. Further, the service 107 may enable a connected wearable device to securely send a specified file to another wearable device. To do so, for instance, the service 107 may receive voice input from the wearable device 110 indicating a desire to transfer a file stored in the mobile device 115 to the mobile device 125. The service 107 may validate the request and prompt the wearable device 110 for confirmation. Doing so allows the user of the wearable device 110 to ensure that the specified file is transferred to an intended recipient.

Figure 2:
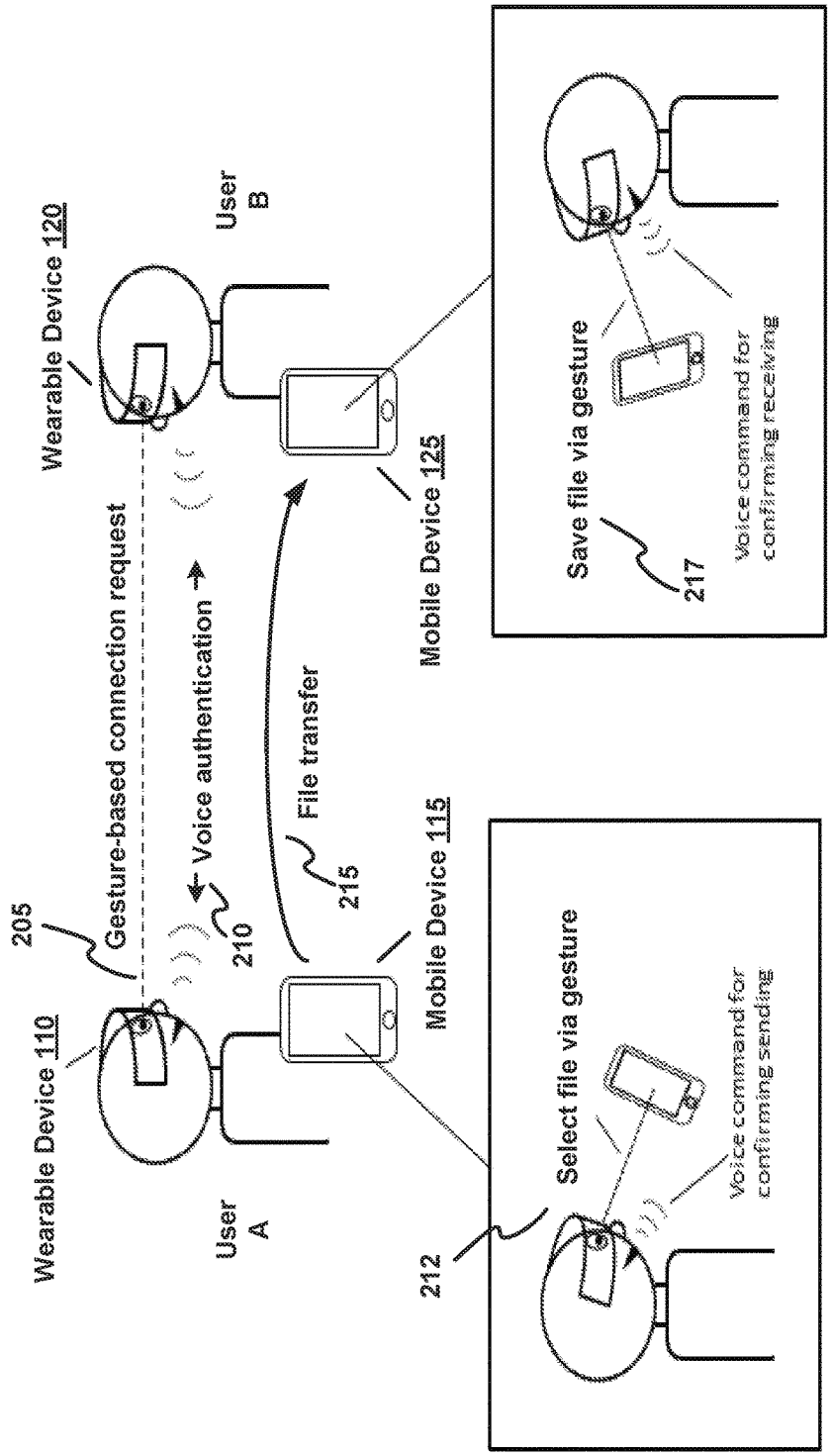
FIG. 2 illustrates a conceptual diagram of invoking a file transfer between mobile devices via a wearable device, according to one embodiment.

FIG. 2 illustrates a conceptual example of invoking a file transfer between mobile devices via a wearable device, according to one embodiment. Illustratively, a user A possesses a wearable device 110 and a mobile device 115, and a user B possesses a wearable device 120 and a mobile device 125.

Also illustratively, user A is conversing with user B. For example, user A may be discussing a photo that was taken by the mobile device 115 (e.g., "I took a great photo the other day."). Further, during the discussion, the user A may express a desire to send the photo to user B (e.g., "I want to send it to you."). Further still, user A is focusing the wearable device 110 towards user B at wearable device 120. This action is referred herein as "gazing." Here, the wearable device 110 detects the gazing gesture at the wearable device 120. Once detected, the wearable device 110 may capture biometric data of user A (e.g., voice, ocular data, etc.) and generate a connection request for initiating a file transfer connection with the wearable device 120.

In addition, the wearable device 110 may activate the on-device microphone to detect voice input corresponding to authentication to initiate the file transfer connection. In one embodiment, the wearable device 110 determines whether voice input corresponds to an authentication, e.g., based on natural language processing (NLP) and voice recognition techniques. The wearable device 110 may include the voice authentication data with the connection request and send the connection request to the server 105, which in turn authenticates the connection and allows the wearable device 110 to establish a file transfer connection with the wearable device 120.

At 212, user A may select a file on the mobile device 115 (e.g., presented via the app 117) using the wearable device 110. Illustratively, the user A focuses a sensor of the wearable device 110 to the display of the mobile device 115 to select the file via a gazing gesture. The user A may also issue a voice command for confirming sending. The wearable device 110 may send the selection and voice command to the server 105 for validation. For example, the server 105 may evaluate the selection and voice command to confirm that the correct file is being sent to the correct recipient. The server 105 may also generate prompts to confirm the selection by the user A on the wearable device 110.

Once validated by the server 105, the wearable device 110 may direct the mobile device 115 to send the selected file to the mobile device 125 (at 215). Illustratively, user B may focus the wearable device 120 to the mobile device 125 to save the file, e.g., by performing a gazing gesture towards the mobile device 125 with the wearable device 120. Further, the wearable device 120 may receive voice input from user B to accept the file sent from mobile device 115.

Figure 3:
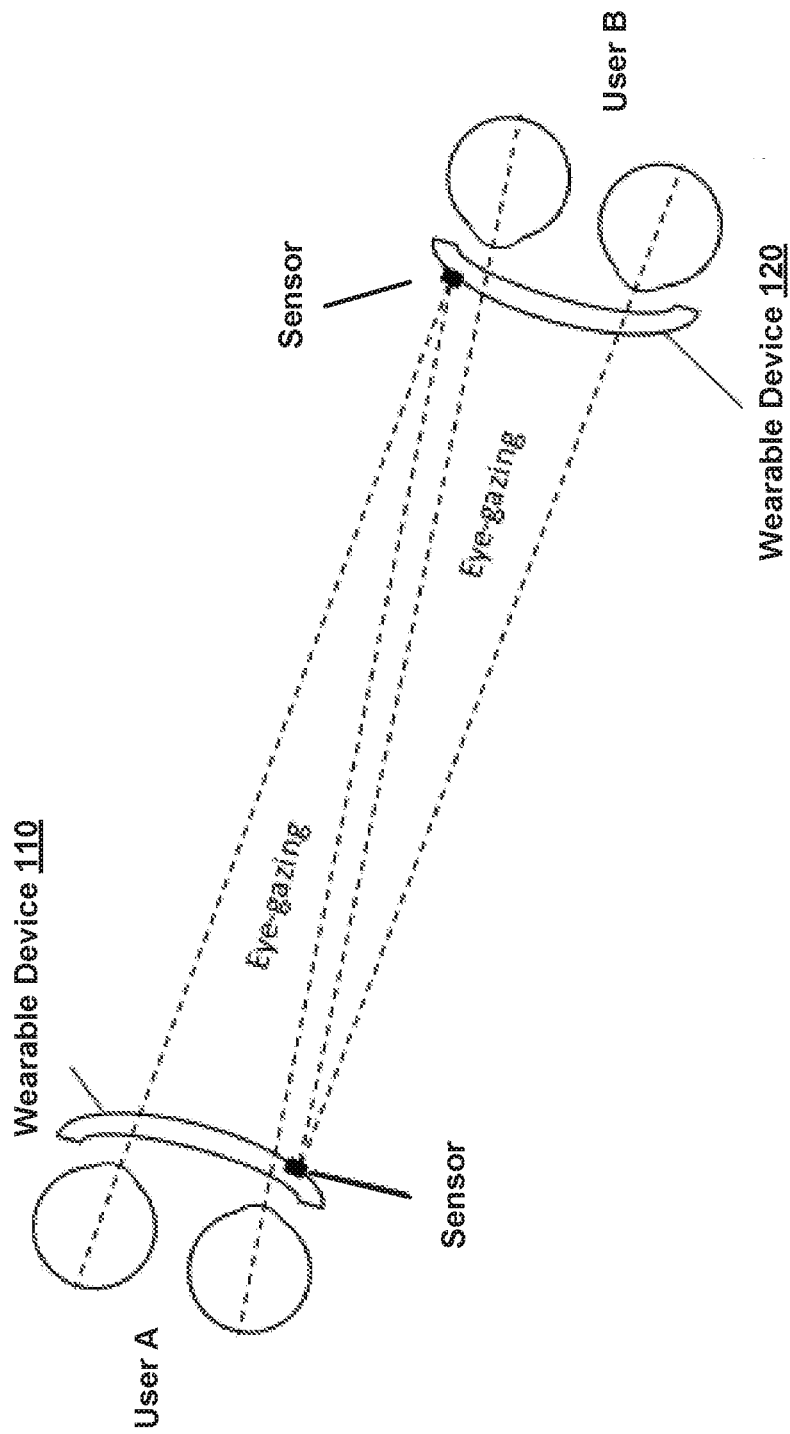
FIG. 3 illustrates an example gazing gesture used to initiate a file transfer connection between wearable devices, according to one embodiment.

FIG. 3 illustrates an example gazing gesture used to initiate a file transfer connection between wearable devices, according to one embodiment. In this particular example, sensors in each of the wearable devices 110 and 120 may detect one another when each of the users A and B look towards each other. The sensors may do so through a variety of methods, such as using infrared signals between the sensors, camera detection, near-field communication (NFC) technology, and so on.

Of course, a gazing gesture is used as a reference example for initiating a file transfer connection between wearable devices. One of skill in the art will recognize that embodiments may be adapted using a variety of gestures to initiate the file transfer connection between the wearable devices. For example, the wearable devices may be configured to identify winking gestures made by another user facing a wearable device. In such an example, a camera in the wearable device may be configured to receive video input in real-time and detect the winking gesture made by the other user. As another example, the wearable device may be configured to recognize a certain motion performed by the user to initiate the connection. In such a case, an accelerometer and gyroscope in the wearable device may detect a specified motion (e.g., a nodding motion by the user wearing the device) to trigger the connection initialization. Further, although embodiments presented herein disclose a wearable device initiating a file transfer connection with a single other wearable device, embodiments are also applicable to multiple wearable devices within a relatively near vicinity.

Figure 4:
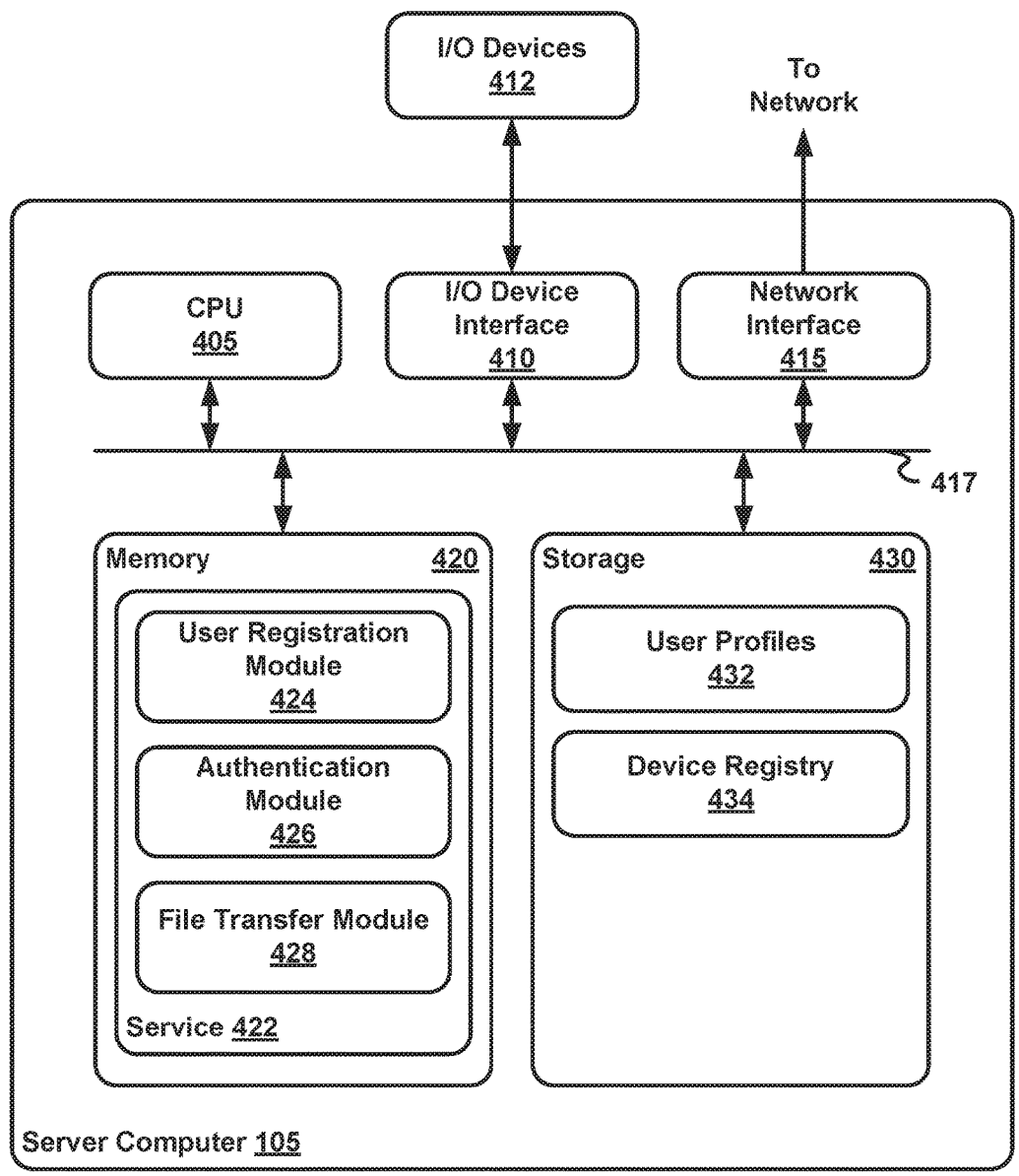
FIG. 4 illustrates an example server computer configured to establish file transfer connections between devices, according to one embodiment.

FIG. 4 illustrates an example server computer 400 configured to establish file transfer connections between devices as a centralized server, according to one embodiment. As shown, the server computer 400 includes, without limitation, a central processing unit (CPU) 405, a network interface 415, a memory 420, and storage 430, each connected to a bus 417. The server computer 400 may also include an I/O device interface 410 connecting I/O devices 412 (e.g., keyboard, display, mouse devices, etc.) to the server computer 400. Further, in context of the present disclosure, the computing elements shown in the server computer 400 may correspond to a physical computing system (e.g., a system in an enterprise network) or a virtual computing instance.

CPU 405 retrieves and executes programming instructions stored in memory 420 as well as stores and retrieves application data residing in the storage 430. The bus 417 is used to transmit programming instructions and application data between CPU 405, I/O devices interface 410, storage 430, network interface 415, and memory 420. Note, CPU 405 is included to be representative of a single CPU, multiple CPUs, a single CPU having multiple processing cores, and the like. Memory 420 is generally included to be representative of a random access memory. Storage 430 may be a disk drive storage device. Although shown as a single unit, storage 430 may be a combination of fixed and/or removable storage devices, such as fixed disc drives, removable memory cards, or optical storage, network attached storage (NAS), or a storage area-network (SAN).

Illustratively, memory 420 includes a service 422. And storage 430 includes one or more user profiles 432 and a device registry 434. Further, the service 422 itself includes a user registration module 424, an authentication module 426, and a file transfer module 428. In one embodiment, the user registration module 424 receives registration information from a wearable device used to create an account on the platform for a given user. For example, the user registration module 424 may receive, from a user, identifying information for the user. This may include a name of the user, contact information, and security credentials for the user account such as a username and password. Further, identifying information for the user includes biometric data associated with the user that can be captured via the wearable device. For example, this may include a voice signature, facial signature, fingerprint, retinal signature, and the like. In addition, user registration module 424 may receive identifying information for a given device, such as a MAC address, serial number, device type, etc.

Once the identifying information for the user and the device is received, the user registration module 424 associates the information with the user and stores the information in a user profile 432 and a device registry 434 entry for the user. The device registry 434 includes device information associated with users of the platform. The device registry 434 may include information such as a device type, ID of the associated user(s), MAC address, device version, and so on.

The user may subsequently log into the platform and modify registered information, as needed (e.g., to change personal information, add a new device, etc., add file permissions for another user or group of other users, etc.). In addition, the user registration module 424 may also import identifying information from a variety of social media services, e.g., using APIs provided by the social media services for accessing user data (e.g., personal information, user connection information, and the like).

In one embodiment, the authentication module 426 receives connection requests from wearable devices. A connection request may include device information as well as biometric data from the wearable devices identified in the request. The authentication module 426 may correlate the data received in the request with the user profiles 432 and device registry 434. If a match to a valid account is identified, the authentication module 426 authenticates the user identities and establishes a connection between the users identified in the underlying request.

In one embodiment, the file transfer module 428 authorizes transfer of a file on a given wearable device to another wearable device. The file transfer module 428 may receive a request from a user to transfer a file from a given mobile device to another mobile device. The file transfer module 428 validates the request. For example, the file transfer module 428 may evaluate the file against permissions specified by the user (e.g., in the corresponding user profile 432. The file transfer module 428 may also prompt the user to confirm the correct file and recipient. To do so, the file transfer module 428 may generate a message that requests confirmation from the user of the correct file and recipient. The file transfer module 428 may then send the message to the wearable device and prompt for confirmation (e.g., by voice input) from the user. Once validated, the file transfer module 428 generates an authorization message and sends the message to the wearable device. In turn, the wearable device may direct the paired mobile device to send the selected file to the target mobile device.

Figure 5:
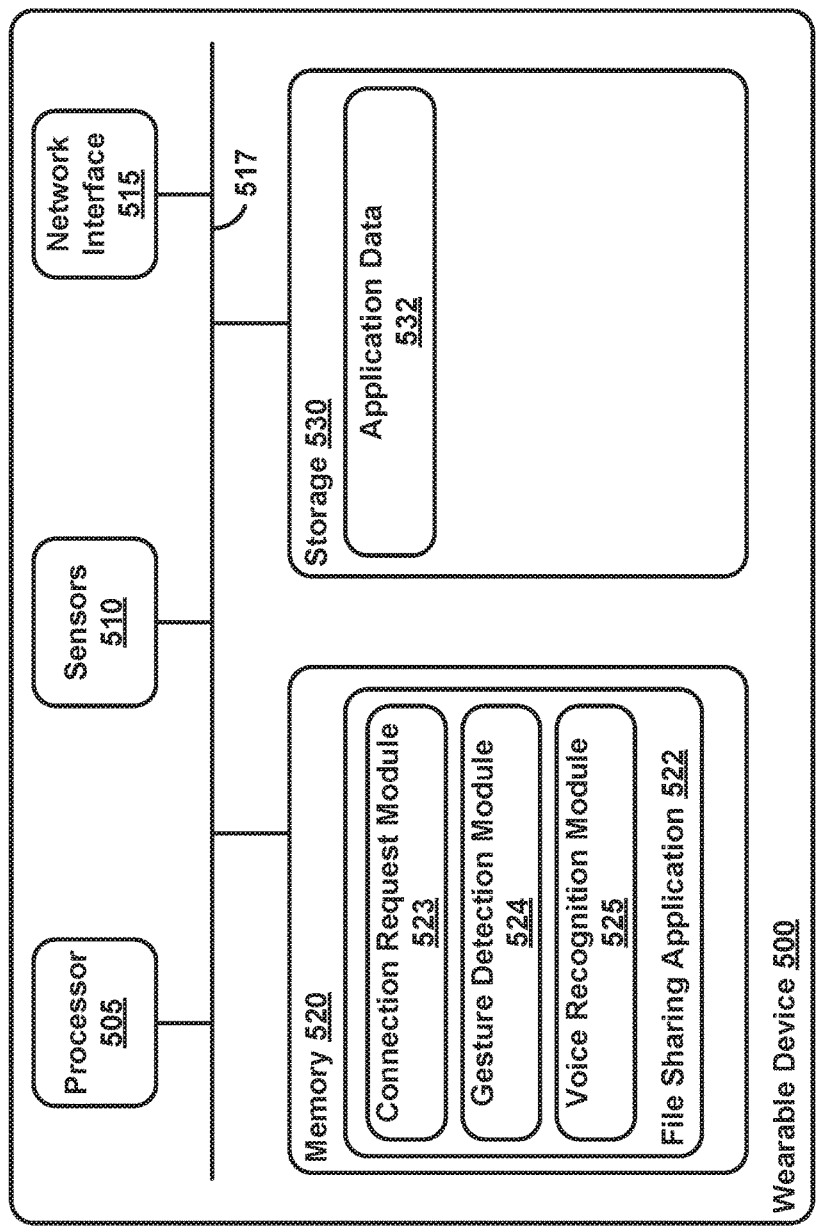
FIG. 5 illustrates an example wearable device configured to invoke file transfers from a paired mobile device, according to one embodiment.

FIG. 5 illustrates an example wearable device 500 configured to invoke file transfers from a paired mobile device, according to one embodiment. In one embodiment, the wearable device 500 represents a head-mounted device that provides a hands-free interface for a user wearing the device. As shown, the wearable device 500 includes a processor 505, one or more sensors 510, a network interface 515, a memory 520, and a storage 530, each interconnected via a bus 517. Of course, an actual wearable device (e.g., a head-mounted device) will include a variety of additional hardware components.

The processor 505 retrieves and executes programming instructions stored in the memory 520. Similarly, the processor 505 stores and retrieves application data residing in the memory 520. The bus 517 is used to transmit instructions and data between the processor 505, sensors 510, network interface 515, memory 520, and the storage 530. The processor 505 is included to be representative of a single CPU, multiple CPUs, a single CPU having multiple processing cores, and the like. The memory 520 is generally included to be representative of memory and storage on the wearable device 500.

The sensors 510 include a number of components for receiving or transmitting data. For example, the sensors 510 include a camera for obtaining a stream of image/video input in real-time. The camera may store such streams in a buffer for analysis by real-time processing applications within the wearable device 500, e.g., to recognize objects, faces, and the like. As another example, the sensors 510 include a microphone for obtaining audio input, such as voice input from a user wearing the wearable device 500 or others engaging the user in conversation. The sensors 510 may also include scanners that capture other biometric data, such as a retinal scanner, fingerprint sensor, and the like.

Illustratively, the memory 520 includes a file sharing application 522. The storage 330 includes application data 532. As shown, the file sharing application 522 itself includes a connection request module 523, a gesture detection module 524, and a voice recognition module 525. The connection request module 523 generates connection requests based on the wearable device 500 detecting a gesture used to initiate the connection. Such a gesture includes wearable devices sensing one another in a direct line of sight within the other at a relatively close proximity.

The connection request module 524 sends requests to the server 105 to establish a file transfer connection with another wearable device.

The gesture detection module 524 is configured to detect such gestures by retrieving data from the sensors 510. To do so, the gesture detection module 524 may communicate with a sensor 510 that detects infrared signals directed to that sensor. The gesture detection module 524 may then compare the received data with predefined gesture configurations provided in the application data 532. Once matched, the gesture detection module 524 may notify the connection request module 523 of the received gesture, e.g., the type of gesture, a timestamp for when the gesture occurred, a target wearable device, and the like.

The voice recognition module 525 receives voice input captured from a sensor 510 (e.g., a microphone). The voice recognition module 525 may translate the voice input to text using a variety of speech recognition and natural language processing libraries provided by the application data 532. Further, the voice recognition module 525 may detect requests by the user to perform some action, such as initiating a file transfer connection, send a specified file to a target user, confirming a selection, and the like. The voice recognition module 525 may send detected voice input for requests to the connection request module 523. The connection request module 523, in turn, may package voice input with a related request for sending to the server 105.

Figure 6:
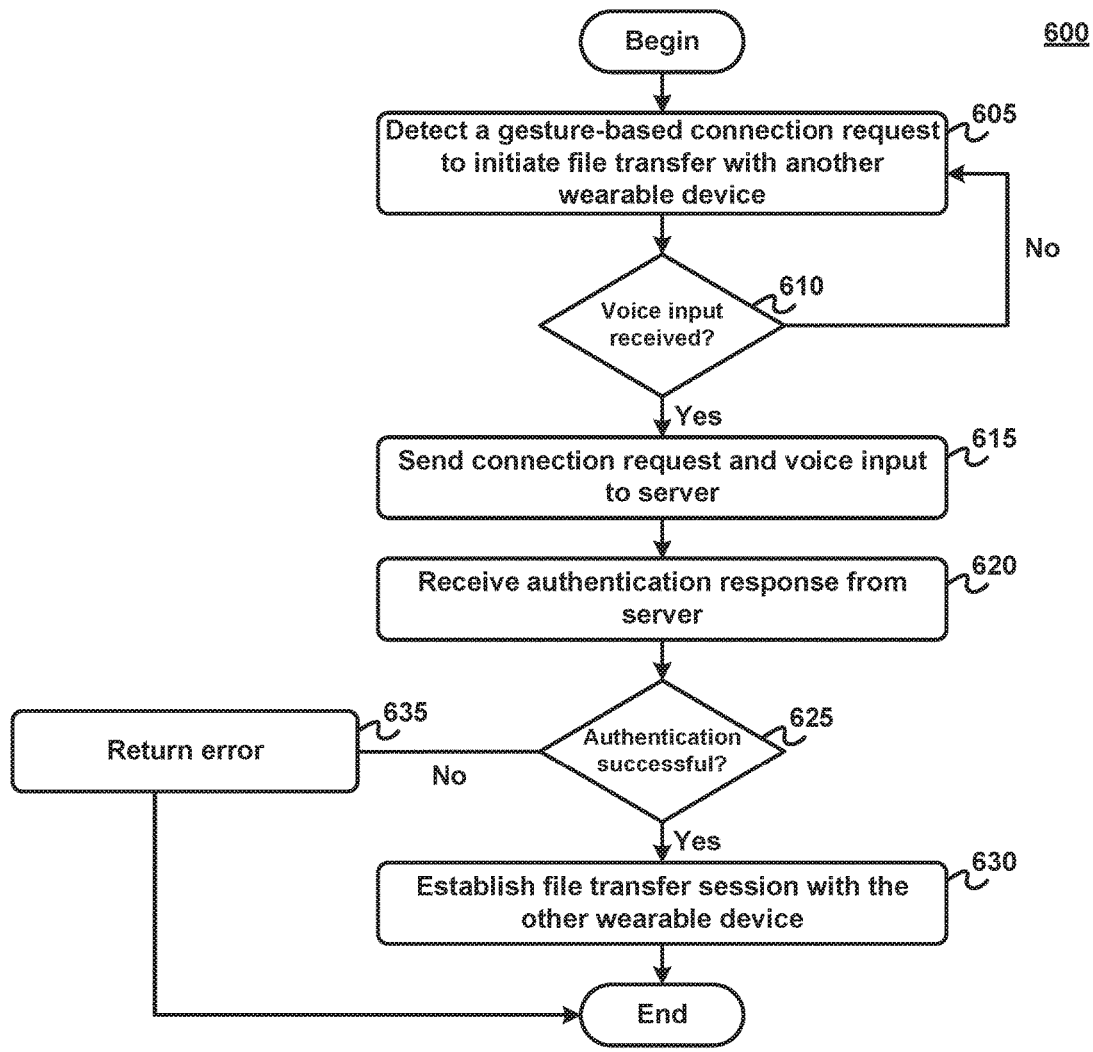
FIG. 6 illustrates a method for initializing a file transfer connection between a wearable device and another wearable device, according to one embodiment.

FIG. 6 illustrates a method 600 for initializing a file transfer connection between a wearable device and another wearable device, according to one embodiment. For example, assume that method 600 takes place from the perspective of the wearable device 500, being operated by a user C. In this example, also assume that user C conversing with a user D who is also operating a wearable device. As shown, the method 600 begins at step 605, where the gesture detection module 524 detects a gesture-based connection request for initiating a file transfer with another wearable device. For example, the gesture detection module 524 detects a gazing gesture made between the two users on the wearable devices.

At step 610, the file sharing application 522 determines whether voice input is received. To do so, the voice recognition module 525 may communicate with a sensor 510 to identify whether any voice input is available relative to the time that the gazing gesture was detected (e.g., within five to ten seconds of the gazing gesture). If not, then the method 600 loops back to step 605. Otherwise, at step 615, the connection request module 615 generates a connection request to send to the server 105. The connection request may include identifying information associated with the wearable devices involved in the communication, user credentials of the wearable device 500, device information associated with the wearable devices 500, geolocation details, and other information that the server 105 may use to authenticate the users. The connection request module 615 may then send the request to the server 105. In turn, the server 105 authenticates the request and sends an authentication response to the wearable device 500.

At step 620, the connection request module 615 receives the authentication response from the server 105. The connection request module 615 evaluates the response to determine whether is authentication was successful (at step 625). If not (e.g., the user was not recognized, credentials invalid, biometric data of either user did not match, etc.), then at step 635, the file sharing application 522 returns an error to the user. Otherwise, if the authentication is successful, then, at step 630, the file sharing application 522 establishes the file transfer session with the other wearable device.

Figure 7:
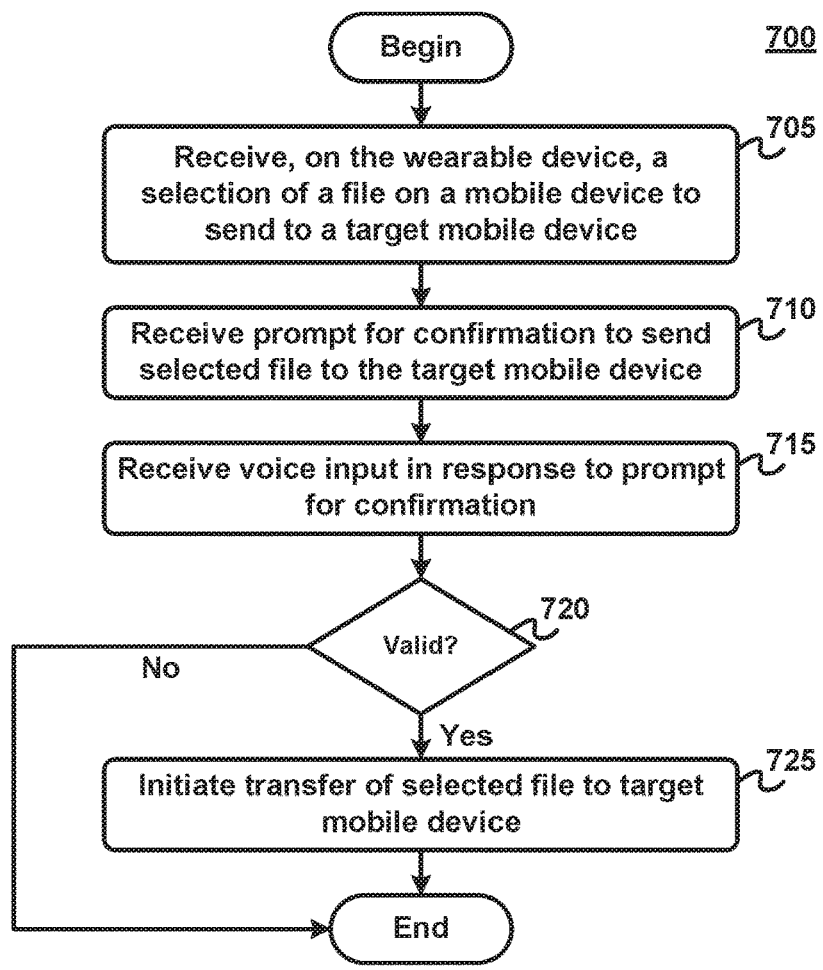
FIG. 7 illustrates a method for transferring a file via a file transfer connection initialized by a wearable device, according to one embodiment.

FIG. 7 illustrates a method 700 for transferring a file via a file transfer connection initialized by a wearable device, according to one embodiment. In particular, method 700 provides steps for directing a mobile device to send a file to another mobile device using wearable devices of two users. In this example, a file transfer connection is already established (e.g., according to the steps of method 600) between two wearable devices.

At step 710, the file sharing application 522 receives a selection of a file on a mobile device to send to a target mobile device. For instance, assume that user C verbally expresses a desire to send a given file on a mobile device associated with wearable device 500 to a mobile device of user D (e.g., "I want to send you this photo I took yesterday."). The gesture detection module 524 may detect that the user A is looking at a filename corresponding to the file on the mobile device and determine this as the selected file. Further, the voice recognition module 525 may receive this as voice input and perform natural language processing techniques on the input to determine that user A wants to send the selected file to user D. The file sharing application 522 may send the selection and request to the server 105, which, in turn, may prompt the user confirmation to send the selected file to the specified recipient.

At step 715, the wearable device 500 receives voice input from the user in response to the prompt for confirmation. The file sharing application 522 may send the voice input to the server 105, where in turn, the server 105 validates the request to transfer the file. The server 105 returns a response to the request. At step 720, the file sharing application 522 evaluates the response to determine whether the server 105 has validated the request. If not, then the method 700 ends.

Otherwise, then at step 725, the file sharing application 522 initiates the transfer of the selected file to the target mobile device. For example, to do so, the file sharing application may direct the mobile device (e.g., using APIs to access an app on the mobile device that has access to the file system) to select the desired file, send the file to the target mobile device via the file transfer connection.

Further, the recipient user may confirm the transfer on the target mobile device via a wearable device paired to the target mobile device. For instance, the recipient may focus the wearable device on the display of the target mobile device as the target mobile device presents a prompt confirming to save the file. The recipient may then issue a voice command to the wearable device to save the file on the mobile device. Once received, the wearable device may direct the mobile device to store and save the file. The wearable devices may generate a confirmation that the transfer is complete and send the confirmation to the server 105. Once sent, the file transfer connection terminates.

Figure 8:
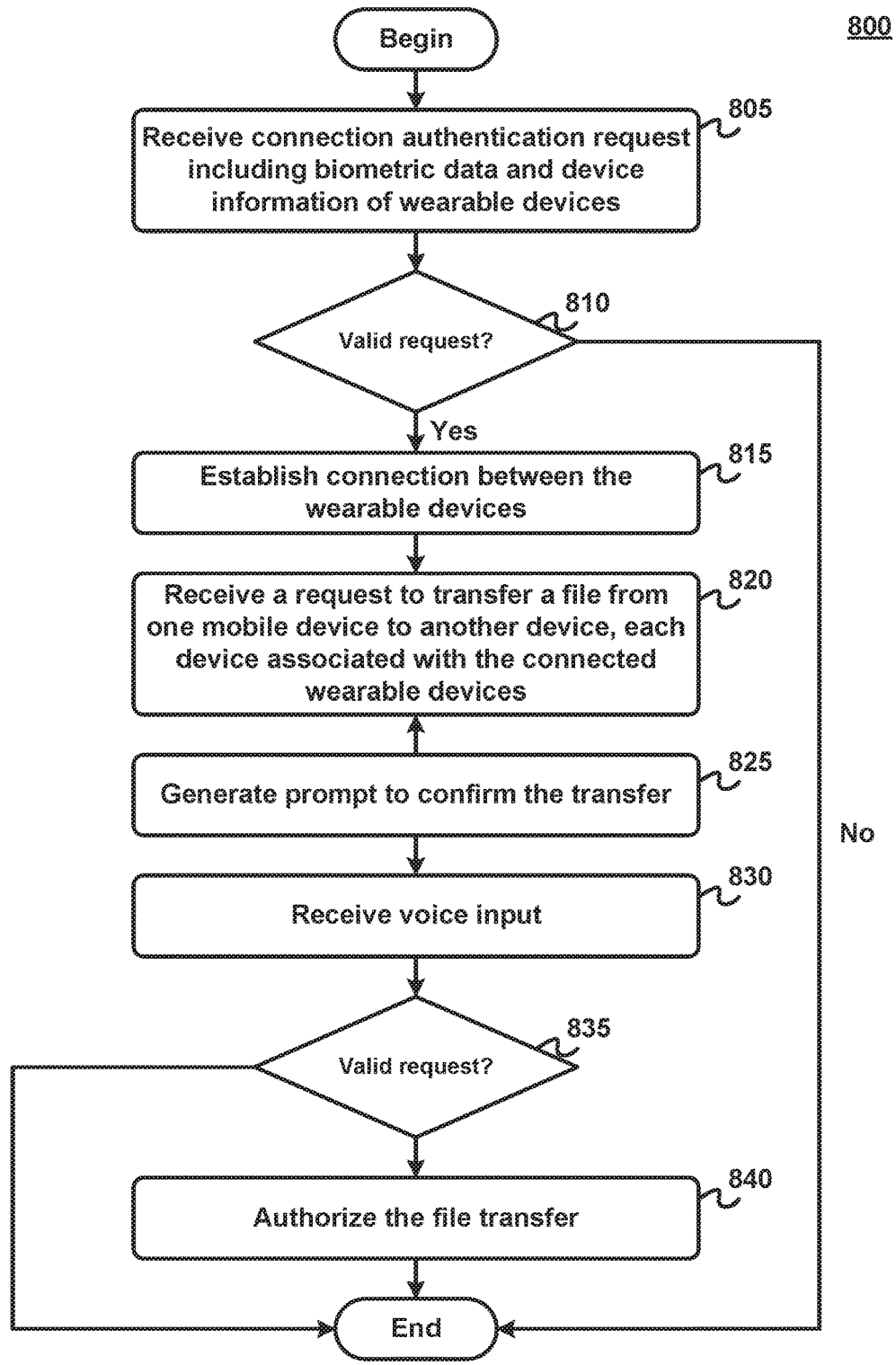
FIG. 8 illustrates a method for establishing a file transfer connection between wearable devices, according to one embodiment.

FIG. 8 illustrates a method 800 for establishing a file transfer connection between wearable devices, according to one embodiment. In particular, method 800 describes establishing the file connection from the perspective of the platform provided by the server 105. As shown, method 800 begins at step 805, where the authentication module 426 receives a connection authentication request from one or more wearable devices. The request may include biometric data and device information associated with the wearable devices to be connected with the file transfer connection.

The authentication module 426 validates the request (at step 810). For example, the authentication module 426 identifies the users specified in the request. The authentication module 426 may then retrieve, from storage, user profiles 432 corresponding to the identified users. The authentication module 426 may then validate the user data received in the request with the retrieved user profiles 432. For example, the authentication module 426 may compare biometric data received in the request with the biometric data provided in the corresponding user profile 432.

If the authentication module 426 determines that the request is not valid, then the method 800 ends. The authentication module 426 may also generate an error message and send the error message to the wearable devices specified in the request. Otherwise, if the request is valid, then, at step 815, the authentication module 426 establishes the file transfer connection between the wearable devices. For example, to do so, the authentication module 426 may generate an authentication response and send the response to the wearable devices specified in the request.

Once the file transfer connection is established, one or more of the connected wearable devices may send a request to transfer a file from a mobile device associated with that wearable device to another mobile device associated with a connected wearable device. At step 820, the file transfer module 428 receives the request. The file transfer module 428 may evaluate the request to identify the source and target mobile devices, source and target users, specified file, and so on. At step 825, the file transfer module 428 generates a prompt for the wearable devices to confirm the transfer. At step 830, the file transfer module 428 receives the voice input response corresponding to the confirmation. At step 835, the file transfer module 428 determines whether the request corresponds to a valid one, e.g., by evaluating the request information and the confirmation. If the request is not valid, then the method 800 ends. The file transfer module 428 may send an error message to the wearable devices. Otherwise, at step 840, the file transfer module 428 authorizes the file transfer. Once the file transfer between the mobile devices is complete, the wearable devices may send a confirmation to the server 105. Once confirmed, the file transfer module 428 may disconnect the file transfer connection.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

In the preceding, reference is made to embodiments presented in this disclosure. However, the scope of the present disclosure is not limited to specific described embodiments. Instead, any combination of the following features and elements, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the preceding aspects, features, embodiments and advantages are merely illustrative and are not considered elements or limitations of the appended claims except where explicitly recited in a claim(s).

Aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system."

The present disclosure may be a system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosed herein. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Embodiments of the present disclosure may be provided to end users through a cloud computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Typically, cloud computing resources are provided to a user on a pay-per-use basis, where users are charged only for the computing resources actually used (e.g. an amount of storage space consumed by a user or a number of virtualized systems instantiated by the user). A user can access any of the resources that reside in the cloud at any time, and from anywhere across the Internet. In context of the present disclosure, a user may access the storage platform or related data available in the cloud. For example, the service 107 could execute on a computing system in the cloud and establish a file transfer connection between two or more wearable devices. In such a case, the service 107 could store user profile data and device information associated with each user at a storage location in the cloud. Doing so allows a user to access this information from any computing system attached to a network connected to the cloud (e.g., the Internet).

While the foregoing is directed to embodiments of the present disclosure, other and further embodiments may be devised without departing from the basic scope thereof, and the scope thereof is determined by the claims that follow.

What is claimed is:

1. A method comprising:
   determining, by a first wearable device, that a first user wearing the first wearable device and a second user wearing a second wearable device are gazing at each other;
   upon determining that the first and second users are gazing at each other, activating, by the first wearable device, a microphone on the first wearable device;
   collecting voice input from the first user using the activated microphone;
   determining that the first user desires to transmit a file to the second user based on processing the voice input using one or more natural language processing techniques;
   upon determining that the first user desires to transmit a file to the second user, generating, from the first wearable device, a gesture-based connection request to connect with the second wearable device, wherein the first wearable device is associated with a first mobile device controlled by the first user, and wherein the second wearable device is associated with a second mobile device controlled by the second user;
   sending the gesture-based connection request to a service to authenticate a connection with the second wearable device;
   establishing the connection with the second wearable device in response to receiving an authentication response from the service; and
   directing, via the first wearable device, the first mobile device to transfer the file to the second mobile device.

2. The method of claim 1, wherein the first and second wearable devices are each a head-mounted wearable device.

3. The method of claim 1, wherein the gesture-based connection request includes information identifying at least a first user and a second user and information identifying the first wearable device and the second wearable device.

4. The method of claim 3, wherein the information identifying the at least the first user includes biometric data associated with the first user.

5. The method of claim 1, further comprising:
   determining that the file was successfully transferred from the first mobile device to the second mobile device; and
   terminating the connection.

6. The method of claim 1, wherein directing, via the first wearable device, the first mobile device to transfer the file to the second mobile device comprises:
   receiving a selection of the file;
   generating a request including the selection of the file;
   sending the request to the service, wherein the service validates the request; and
   upon receiving a validation from the service for the request, sending the file to the second mobile device.

7. A computer program product, comprising:
   a computer-readable storage medium storing instructions, which, when executed on a processor, performs an operation comprising:
   determining, by a first wearable device, that a first user wearing the first wearable device and a second user wearing a second wearable device are gazing at each other,
   upon determining that the first and second users are gazing at each other, activating, by the first wearable device, a microphone on the first wearable device,
   collecting voice input from the first user using the activated microphone,
   determining that the first user desires to transmit a file to the second user based on processing the voice input using one or more natural language processing techniques,
   upon determining that the first user desires to transmit a file to the second user, generating, from the first wearable device, a gesture-based connection request to connect with the second wearable device, wherein the first wearable device is associated with a first mobile device controlled by the first user, and wherein the second wearable device is associated with a second mobile device controlled by the second user,
   sending the gesture-based connection request to a service to authenticate a connection with the second wearable device,
   establishing the connection with the second wearable device in response to receiving an authentication response from the service, and
   directing, via the first wearable device, the first mobile device to transfer the file to the second mobile device.

8. The computer program product of claim 7, wherein the first and second wearable devices are each a head-mounted wearable device.

9. The computer program product of claim 7, wherein the gesture-based connection request includes information identifying at least a first user and a second user and information identifying the first wearable device and the second wearable device.

10. The computer program product of claim 9, wherein the information identifying the at least the first user includes biometric data associated with the first user.

11. The computer program product of claim 7, wherein the operation further comprises:
  determining that the file was successfully transferred from the first mobile device to the second mobile device; and
  terminating the connection.

12. The computer program product of claim 7, wherein directing, via the first wearable device, the first mobile device to transfer the file to the second mobile device comprises:
  receiving a selection of the file;
  generating a request including the selection of the file;
  sending the request to the service, wherein the service validates the request; and
  upon receiving a validation from the service for the request, sending the file to the second mobile device.

13. A system, comprising:
  a processor; and
  a memory storing program code, which, when executed on the processor, performs an operation comprising:
    determining, by a first wearable device, that a first user wearing the first wearable device and a second user wearing a second wearable device are gazing at each other,
    upon determining that the first and second users are gazing at each other, activating, by the first wearable device, a microphone on the first wearable device,
    collecting voice input from the first user using the activated microphone,
    determining that the first user desires to transmit a file to the second user based on processing the voice input using one or more natural language processing techniques,
    upon determining that the first user desires to transmit a file to the second user, generating, from the first wearable device, a gesture-based connection request to connect with the second wearable device, wherein the first wearable device is associated with a first mobile device controlled by the first user, and wherein the second wearable device is associated with a second mobile device controlled by the second user,
    sending the gesture-based connection request to a service to authenticate a connection with the second wearable device,
    establishing the connection with the second wearable device in response to receiving an authentication response from the service, and
    directing, via the first wearable device, the first mobile device to transfer the file to the second mobile device.

14. The system of claim 13, wherein the gesture-based connection request includes information identifying at least a first user and a second user and information identifying the first wearable device and the second wearable device.

15. The system of claim 14, wherein the information identifying the at least the first user includes biometric data associated with the first user.

16. The system of claim 13, wherein the operation further comprises:
  determining that the file was successfully transferred from the first mobile device to the second mobile device; and
  terminating the connection.

17. The system of claim 13, wherein directing, via the first wearable device, the first mobile device to transfer the file to the second mobile device comprises:
  receiving a selection of the file;
  generating a request including the selection of the file;
  sending the request to the service, wherein the service validates the request; and
  upon receiving a validation from the service for the request, sending the file to the second mobile device.

* * * * *